(12) United States Patent
Cypher

(10) Patent No.: US 8,140,945 B2
(45) Date of Patent: Mar. 20, 2012

(54) HARD COMPONENT FAILURE DETECTION AND CORRECTION

(75) Inventor: Robert E. Cypher, Saratoga, CA (US)

(73) Assignee: Oracle America, Inc., Redwood City, CA (US)

( * ) Notice: Subject to any disclaimer, the term of this patent is extended or adjusted under 35 U.S.C. 154(b) by 971 days.

(21) Appl. No.: 12/126,325

(22) Filed: May 23, 2008

(65) Prior Publication Data

US 2009/0292968 A1    Nov. 26, 2009

(51) Int. Cl.
 *H03M 13/00* (2006.01)
(52) U.S. Cl. .................................... 714/785; 714/758
(58) Field of Classification Search ............... 714/758, 714/785
See application file for complete search history.

(56) References Cited

U.S. PATENT DOCUMENTS

| | | | |
|---|---|---|---|
| 3,868,632 A | 2/1975 | Hong et al. | |
| 4,646,312 A | 2/1987 | Goldsbury et al. | |
| 5,081,626 A | 1/1992 | Scott | |
| 5,745,508 A | 4/1998 | Prohofsky | |
| 5,872,798 A | 2/1999 | Baggen et al. | |
| 6,018,817 A * | 1/2000 | Chen et al. | 714/762 |
| 6,519,736 B1 * | 2/2003 | Chen et al. | 714/768 |
| 6,973,613 B2 * | 12/2005 | Cypher | 714/773 |
| 7,051,264 B2 * | 5/2006 | Leung et al. | 714/763 |
| 7,103,824 B2 | 9/2006 | Halford | |
| 7,171,591 B2 * | 1/2007 | Chen | 714/52 |
| 7,188,296 B1 * | 3/2007 | Cypher | 714/755 |
| 7,243,293 B2 * | 7/2007 | Chen | 714/781 |
| 7,496,826 B2 * | 2/2009 | Holman | 714/785 |
| 7,509,560 B2 * | 3/2009 | Alexander et al. | 714/763 |
| 7,530,008 B2 | 5/2009 | Das et al. | |
| 7,761,771 B2 * | 7/2010 | Gower et al. | 714/763 |
| 2002/0157044 A1 | 10/2002 | Byrd | |
| 2005/0034050 A1 | 2/2005 | Das et al. | |

OTHER PUBLICATIONS

PCI Express, "PCI Express(TM) Base Specification," Revision 1.0a, Apr. 15, 2003, 3 pages.

* cited by examiner

*Primary Examiner* — Esaw Abraham
(74) *Attorney, Agent, or Firm* — Lawrence J. Merkel; Meyertons, Hood, Kivlin, Kowert & Goetzel, P.C.

(57) ABSTRACT

In one embodiment, a memory controller comprises a check bit encoder circuit coupled to receive a data block to be written to memory, a check/correct circuit coupled to receive an encoded data block read from the memory, and a hard failure detection circuit coupled to the check/correct circuit. The check bit encoder circuit is configured to generate a corresponding encoded data block comprising the data block, a first plurality of check bits, and a second plurality of check bits. The check/correct circuit is configured to detect an error in the encoded data block responsive to the first check bits, the second check bits, and the data block within the encoded data block, which is logically arranged as an array of R rows and N columns, wherein R and N are positive integers. Each of the first check bits covers a respective row of the array, and the check/correct circuit is configured to generate a first syndrome corresponding to the first plurality of check bits. A presence of more than one binary one in the first syndrome indicates a multi-bit error. Responsive to detecting the multi-bit error, the hard failure detection circuit is configured to perform a plurality of memory read/write operations to the memory locations in which the encoded data block is stored to identify a hard error failure in the memory.

18 Claims, 11 Drawing Sheets

Fig. 3

|       | $c_0$ | $c_1$ |  | $c_{N-1}$ |
|-------|-------|-------|--|-----------|
| $r_0$ | Row Check Bits | Inner Check Bits | Data | |
| $r_1$ | | | | |
| ⋮     | | | | |
| $r_{R-1}$ | | | | |

Fig. 4

Check_Vector($r_z$, $c_y$) = key_y * alpha$^z$ (in GF($2^X$)) ← 30 row_syn * key_i = inner_syn (in GF($2^x$)) ← 32 key_y !=0 (in GF($2^X$)) for 0<=y<=C-1 ← 34

HARD COMPONENT FAILURE DETECTION AND CORRECTION

BACKGROUND OF THE INVENTION

1. Field of the Invention

This invention is related to error correction code (ECC) systems.

2. Description of the Related Art

Error codes are commonly used in electronic systems to detect and correct data errors, such as transmission errors or storage errors. For example, error codes may be used to detect and correct errors in data transmitted via any transmission medium (e.g. conductors and/or transmitting devices between chips in an electronic system, a network connect, a telephone line, a radio transmitter, etc.). Error codes may additionally be used to detect and correct errors associated with data stored in the memory of computer systems. One common use of error codes is to detect and correct errors of data transmitted on a data bus of a computer system. In such systems, error correction bits, or check bits, may be generated for the data prior to its transfer or storage. When the data is received or retrieved, the check bits may be used to detect and correct errors within the data.

Component failures are a common source of error in electrical systems. Faulty components may include faulty memory chips or faulty data paths provided between devices of a system. Faulty data paths can result from, for example, faulty pins, faulty data traces, or faulty wires. Additionally, memory modules, which may contain multiple memory chips, may fail. Circuitry which drives the data paths may also fail. Component failures are referred to as "hard" failures.

Another source of error in electrical systems may be so-called "soft" or "transient errors". Transient memory errors may be errors caused by the occurrence of an event, rather than a defect in the memory circuitry itself. Transient memory errors may occur due to, for example, random alpha particles striking the memory circuit. Transient communication errors may occur due to noise on the data paths, inaccurate sampling of the data due to clock drift, etc.

Generally, various error detection code (EDC) and error correction code (ECC) schemes are used to detect and correct memory and/or communication errors. For example, parity may be used. With parity, a single parity bit is stored/transmitted for a given set of data bits, representing whether the number of binary ones in the data bits is even or odd. The parity is generated when the set of data bits is stored/transmitted and is checked when the set of data bits is accessed/received. If the parity doesn't match the accessed set of data bits, then an error is detected.

Other EDC/ECC schemes assign several check bits per set of data bits. The check bits are encoded from various overlapping combinations of the corresponding data bits. The encodings are selected such that a bit error or errors may be detected, and in some cases the encodings may be selected such that the bit or bits in error may be identifiable so that the error can be corrected (depending on the number of bits in error and the ECC scheme being used). Typically, as the number of bit errors that can be detected and/or corrected increases, the number of check bits used in the scheme increases as well.

SUMMARY

In one embodiment, a memory controller comprises a check bit encoder circuit coupled to receive a data block to be written to memory, a check/correct circuit coupled to receive an encoded data block read from the memory, and a hard failure detection circuit coupled to the check/correct circuit. The check bit encoder circuit is configured to generate a corresponding encoded data block comprising the data block, a first plurality of check bits, and a second plurality of check bits. The check/correct circuit is configured to detect an error in the encoded data block responsive to the first plurality of check bits, the second plurality of check bits, and the data block within the encoded data block. The encoded data block is logically arranged as an array of R rows and N columns, wherein R and N are positive integers. Each of the first plurality of check bits covers a respective row of the array, and the check/correct circuit is configured to generate a first syndrome corresponding to the first plurality of check bits. A presence of more than one binary one in the first syndrome indicates a multi-bit error. Responsive to detecting the multi-bit error, the hard failure detection circuit is configured to perform a plurality of memory read/write operations to the memory locations in which the encoded data block is stored to identify a hard error failure in the memory. A corresponding method is also contemplated.

In another embodiment, an apparatus comprises a check bit encoder circuit coupled to receive a data block and a check/correct circuit coupled to receive an encoded data block. The check bit encoder circuit is configured to generate a corresponding encoded data block comprising the data block, a first plurality of check bits, and a second plurality of check bits. The check/correct circuit is configured to detect an error in data from one of a plurality of components and correct the error using the first plurality of check bits, the second plurality of check bits, and the data block within the encoded data block. The encoded data block is logically arranged as an array of R rows and N columns, wherein R and N are positive integers. The first plurality of check bits form a first column of the array, and each of the first plurality of check bits covers a row of the array. The second plurality of check bits are stored in a second column of the array and are defined to cover bits in the array according to a plurality of check vectors. Each of the plurality of check vectors corresponds to a different bit in the array and is an element of a Galois Field ($GF(2^X)$), where X is a positive integer equal to a number of the second plurality of bits. The plurality of check vectors are derived from a plurality of unique elements of $GF(2^X)$, each of the plurality of unique elements corresponding to a different column of the array, and each of the plurality of unique elements includes at least one non-zero bit, including the element corresponding to the first column of the array. The check vector in row Z of the column is the product, in $GF(2^X)$ of the unique element for that column and $alpha^Z$, wherein alpha is a primitive element of $GF(2^X)$.

BRIEF DESCRIPTION OF THE DRAWINGS

The following detailed description makes reference to the accompanying drawings, which are now briefly described.

FIG. 3 is a block diagram illustrating a logical array of data bits forming one embodiment of a code word, indicating the storage of the bits in memory devices.

FIG. 4 is a block diagram illustrating the logical array of data bits and the storage of check bits in columns of the array.

as shown in FIG. 5).

Figure 1:
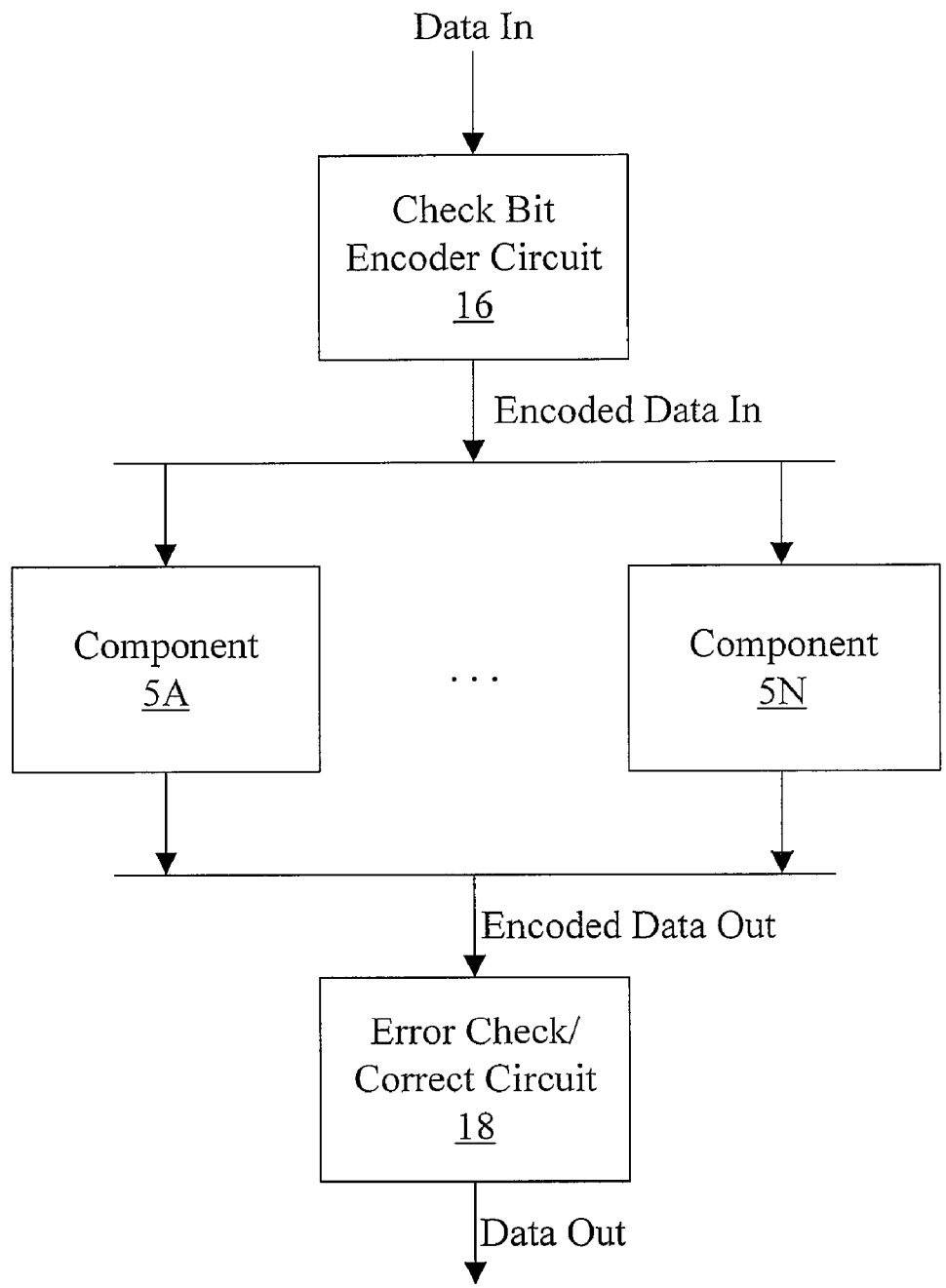
FIG. 1 is a block diagram of one embodiment of a check bit encoder circuit, a plurality of components, and an error check/correct (ECC) circuit.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Apparatus Overview

Turning now to FIG. 1, a block diagram of one embodiment of an apparatus including a check bit encoder circuit 16, a plurality of components 5A-5N, and an error check/correct circuit 18 is shown. In the embodiment of FIG. 1, the check bit encoder circuit 16 is coupled to receive input data (Data In in FIG. 1) and to provide corresponding encoded data (Encoded Data In in FIG. 1) to the components 5A-5N. The components 5A-5N are coupled to receive the encoded data from the check bit encoder circuit 16 and to provide encoded data (Encoded Data Out in FIG. 1) to the error check/correct circuit 18, which is configured to provide corresponding output data (Data Out in FIG. 1).

The apparatus may operate on data blocks, and may encode the data blocks with check bits to provide for error detection and correction of the data blocks. More particularly, the check bit encoder circuit 16 may receive a data block and may generate a corresponding encoded data block including the check bits that cover the data block. The check bit encoder circuit 16 may then transmit the encoded data block to the components 5A-5N. The components 5A-5N may transmit an encoded data block to the error check/correct circuit 18, which may decode the encoded data block, detect (and in some cases correct) errors in the data block, and transmit the output data block. Errors that may be introduced in the components 5A-5N (and/or the interconnect between the components 5A-5N, the check bit encoder circuit 16, and the error check/correct circuit 18) may be detected and possibly corrected.

As used herein, the term "component" includes one or more of: interconnect, circuitry, and/or storage. For example, in some embodiments described below, the check bit encoder circuit 16 and the error check/correct circuit 18 may be implemented in a memory controller. The components 5A-5N may comprise memory devices in the memory system to which the memory controller is coupled. In other embodiments described below, the check bit encoder circuit 16 may be implemented in a source that transmits data on a communication medium, and the error check/correct circuit 18 may be implemented in a destination that receives the data from the communication medium. In such embodiments, the components 5A-5N may comprise communication paths in a communication medium between the source and the destination. The components 5A-5N may further comprise circuitry in the communication medium (e.g. switches).

Generally, the encoded data block (also referred to herein as a "code word") may be logically arranged as an array of rows and columns, where the data in each column corresponds to one component 5A-5N. For example, if the components 5A-5N include storage, the data in a given component's column may be data from the code word that is stored in that component. If the components 5A-5N include interconnect, the data in a given component's column may be data from the code word that is transmitted on that component. If the components 5A-5N include circuitry that operate on the data, the data in a given component's column may be data from the code word that is operated on by that component.

In one embodiment, the check bits in the code word include a first set of check bits stored in a first column of the array (and thus corresponding to a first component) and a second set of check bits stored in a second column of the array (and thus corresponding to a second component). Each check bit in the first set of check bits (referred to herein as "row check bits") may cover the bits in the same row as that check bit. For example, the check bit encoder circuit 16 may generate each check bit as an exclusive OR (XOR) of the other bits in the same row. Thus, if the bits in each row of the code word are XOR'd by the error check/correct circuit 18, a resulting bit vector may represent a pattern of errors in one of the columns (corresponding to one of the components). That is, if the resulting bit vector is non-zero, the set bits in the resulting bit vector identify which rows in one column have an error. The resulting bit vector is also referred to herein as the "row syndrome". The second set of check bits (referred to herein as "inner check bits") may cover various overlapping subsets of the remaining bits. In one embodiment, the inner check bits may be any number of check bits (X), wherein X is a positive integer that is greater than or equal to the (base 2) logarithm of the number of columns in the logical array. In one embodiment, the only requirement on the definition of which inner check bits cover which bits in the logical array is that each of the bits in a given row is covered by a unique set of inner check bits (to allow identification of a component failure when the row syndrome is non-zero). Various embodiments may obtain additional error detection and/or correction properties based on how the inner check bits are selected.

For example, in one embodiment, the inner check bits may be defined using a Galois field (GF). Each column in the array may be assigned a key, which is a unique element of $GF(2^X)$, where X is the number of inner check bits (as mentioned above). The key may be used as a check vector for the bit in row 0 of the corresponding column. A check vector may have a bit for each of the inner check bits (corresponding to the row in the second column that stores that inner check bit) and may define which of the second set of check bits covers that bit. That is, each set bit in the check vector may indicate that the check bit in the corresponding position of the second column covers that bit. Check vectors for bits in the column may be generated by multiplying, in $GF(2^X)$, the key by $alpha^Z$, where Z is the row number storing the bit for which the check vector is being generated and alpha is a primitive element of $GF(2^X)$. A code defined in this fashion may permit detection and probabilistic correction of a single component failure using R+X check bits. The probability of correcting the failure is approximately one minus a factor that is inversely proportional to $2^X$. Those component failures that cannot be corrected are detected. In one embodiment, the key for the column containing the row check bits includes at least one binary one bit (i.e. the key is non-zero), and the check vectors as a whole are strictly non-zero, but the key for the column containing the row check bits is selected so that the definition of the check bits is non-circular. For example, it can be shown that a key of all binary zeros except the least significant two bits (which are binary one) for the column containing the row check bits provides a non-circular definition. However, other key selections are also possible.

In various embodiments, if the row syndrome indicates a multi-bit error (i.e. there is more than one binary one in the row syndrome), a memory controller may perform a set of two or more memory read/write operations to determine hard failures in the memory locations storing the encoded data block. In some cases, e.g. if the failing bits are all in the same component, the hard failure may be correctable. In other cases, the hard failure may only be detected. However, in some embodiments, the mechanism may guarantee that the hard failure is detected, which may prevent data corruption that would otherwise occur if the erroneous data were provided in response to a read.

Additional details of one embodiment of the check bit definition are described below. The example of a memory controller is used for much of the description, but the check bit definition and other properties of the defined code may apply to any apparatus having any set of components 5A-5N, in some embodiments.

As used herein, a data block is the unit of data over which check bits are generated. The error detection/correction capabilities may be measured in terms of the errors detected and corrected in a single data block. An encoded data block includes the data block and the corresponding check bits generated by the check bit encoder circuit 16 (and decoded by the error check/correct circuit 18 to detect errors and correct errors, where applicable).

Memory Controller Overview

Figure 2:
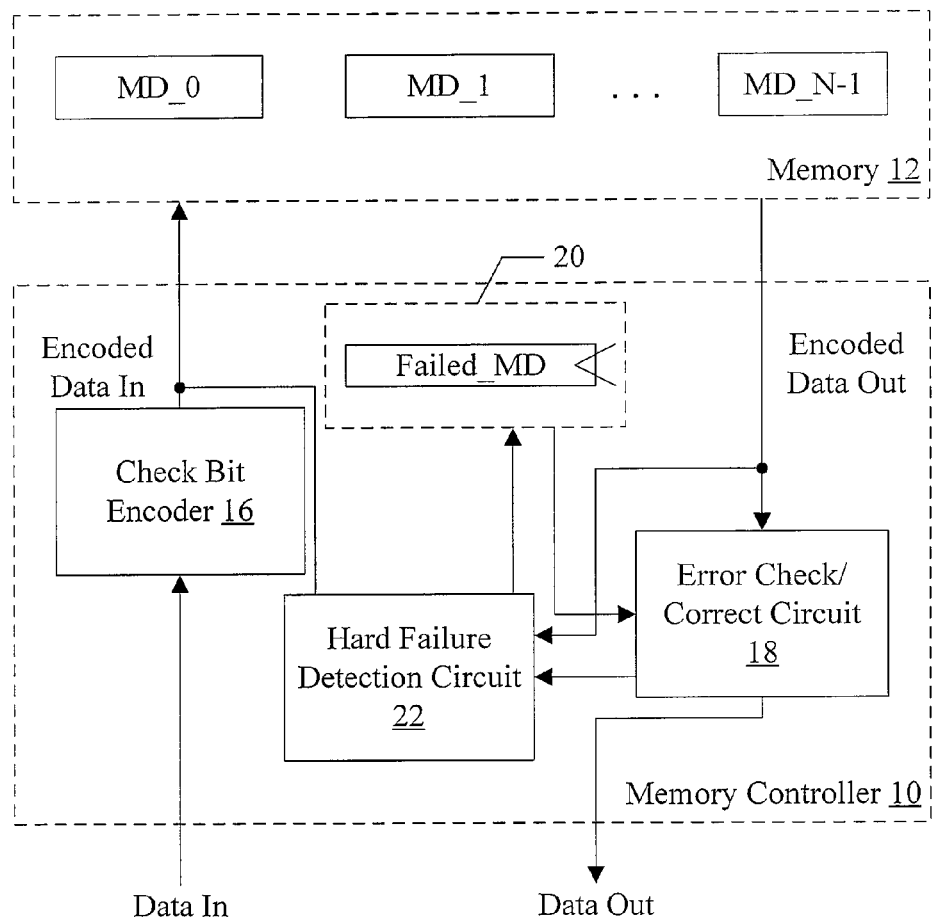
FIG. 2 is a block diagram of one embodiment of a memory controller.

Turning now to FIG. 2, a block diagram of one embodiment of a memory controller 10 and a memory 12 comprising a plurality of memory devices MD_0 to MD_N−1 is shown. There may be N memory devices total, where N is a positive integer. The memory controller 10 is coupled to the memory 12. In the illustrated embodiment, the memory controller 10 includes the check bit encoder circuit 16, the error check/correct circuit 18, a hard failure detection circuit 22, and a persistent state storage 20. The check bit encoder circuit 16 is coupled to receive data input to the memory controller (Data In), and to provide encoded data (Encoded Data In) to the memory 12 for storage. The hard failure detection circuit is also configured to provided data to the memory 12 for storage using the encoded data interface. The error check/correct circuit 18 is coupled to receive encoded data read from the memory 12 (Encoded Data Out) to provide corresponding data (Data Out) to output from the memory controller 10. The error check/correct circuit 18 is coupled to the persistent state storage 20 and to provide a row syndrome to the hard failure detection circuit 22. The hard failure detection circuit 22 is also coupled to receive the data from the memory 12.

Figure 12:
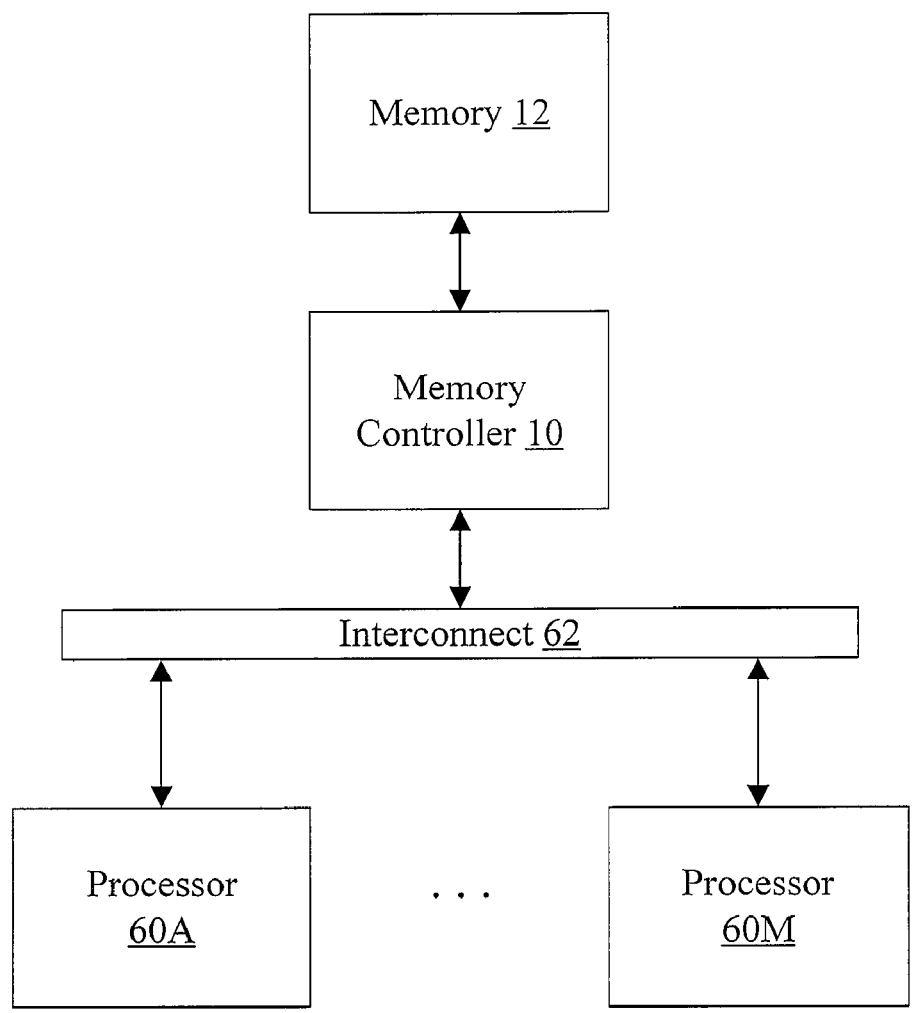
FIG. 12 is a block diagram of one embodiment of a computer system including one embodiment of the memory controller.

The memory controller 10 is coupled to receive read and write requests from various sources (e.g. processors and/or peripheral devices in a computer system including the memory controller 10, such as the computer system shown in FIG. 12). The memory controller 10 may have any interface for receiving the read and write requests (e.g. a bus interface, a packet interface, etc.). In one particular embodiment, the memory controller 10 may support input and output, unidirectional, source synchronous interfaces for transferring address and data packets comprising a request.

The memory controller 10 is configured to encode data to be written to the memory with a plurality of check bits, thus generating the encoded data to be stored in the memory. The encoded data may comprise the data supplied to the memory controller and the check bits, arranged in a predetermined fashion for storage in the various memory devices of the memory 12. Additionally, when encoded data is read from the memory 12, the error check/correct circuit 18 is configured to decode the encoded data to detect certain errors in the data and, in some cases, to correct the errors. The corrected data is supplied as an output of the memory controller 10.

The data written to the memory 12 by the memory controller 10 may comprise data from a write request received by the memory controller 10 ("Data In" in FIG. 2). In some embodiments, data written to the memory 12 may comprise data read from the memory 12 for which an error was detected and corrected. For example, in some embodiments, single bit errors may be corrected. Additionally, in some embodiments, the data written may be data provided by the hard failure detection circuit 22 as part of the read/write operations used to detect a hard failure. In some embodiments, the memory controller 10 may track the number of recent correctable errors, and if the number is less than a threshold, the memory controller 10 may assume that the error is a transient error and may write the data (with the error corrected), back to the memory 12. In other embodiments, if a correctable error is detected during a memory read, the memory controller 10 may repeat the read to see if the error occurs again. If no error is detected in the repeated read, then the error may have been a transient signal error and no correction in the memory 12 is needed. If an error is detected again, then the memory controller 10 may write the corrected data back to memory.

The memory controller 10 may be configured to detect (and in some cases to correct) various errors through the encodings of the check bits. For example, as mentioned above, in one embodiment, the check bits may provide for detection and probabilistic correction of the failure of a memory device. The correction may include reconstructing the data that was stored in the failed memory device using the check bits and the data from the other memory devices. The correction may also include "mapping out" the failed memory device such that the failed memory device is no longer used to store bits of encoded data blocks.

The persistent state storage 20 is configured to record state information regarding the persistent failures which have been detected by the memory controller 10. In the illustrated embodiment, the persistent state may include an indication of a failed memory device (Failed_MD in FIG. 2). The persistent state storage 20 may be formed from any type of persistent storage (e.g. registers, memory arrays, etc.).

A write request may supply up to a predetermined amount of data to be written to the memory, and similarly a read request may transfer up to a predetermined amount of data from the memory. For example, in one embodiment, a read or write request may supply a cache line of data. The cache line may be of any size (e.g. 32 bytes, 64 bytes, 128 bytes, etc.). In one particular implementation, a cache line may comprise 64 bytes of data (512 bits). The data supplied via a write request may further include metadata bits in some embodiments. Generally, metadata bits may be used to describe various properties of the corresponding cache line (e.g. type of data, coherency information, etc.). Any metadata used by the producers and consumers of the data (e.g. processors) may be encoded in the metadata.

The cache line may be divided into one or more data blocks. Check bits are generated for each data block independent of the other data blocks corresponding to a given cache line. The encoded data block (comprising the data bits, metadata bits if applicable, and the check bits arranged in a predetermined fashion) corresponding to each data block is referred to as a code word herein. A portion of the code word may be stored in each memory device MD_0 to MD_N−1.

As used herein, a memory device includes any memory packaged into a single device package having pins for accessing the memory device for writing and reading data stored therein. For example, a memory device may include a dynamic random access memory (DRAM) of any type (e.g. asynchronous DRAM, synchronous DRAM (SDRAM), RAMBUS DRAM (RDRAM), double data rate SDRAM (DDR SDRAM), etc.). A memory device may also include static RAM (SRAM), flash memory, etc. A memory device may include any memory which is subject to transient or persistent errors. In some embodiments, a memory device may be a single chip. In some cases, two or more memory devices may be included on a memory module. A memory module is a circuit board to which two or more memory devices have been attached. For example, memory modules may include dual inline memory modules (DIMMs), single inline memory modules (SIMMs), and any other type of memory modules.

As used herein, a check bit refers to a bit which is generated from two or more data bits and/or other check bits for providing error detection in the data bits/check bits (and optionally, depending on the definition of the check bits as a whole, error correction). A first check bit is referred to as "covering" a given data bit or given check bit if: (i) the given data bit/check bit is used in the generation of the first check bit (and thus the first check bit aids in the error detection/correction of that data bit/check bit); or (ii) the given check bit is the first check bit (that is, the first check bit may cover itself). For example, a check bit may be generated from two or more data bits/check bits by exclusive OR (XOR) or exclusive NOR (XNOR) of the two or more data bits/check bits.

It is noted that various buffers and/or queues (not shown) may be included in the memory controller 10 as desired for buffering data. Furthermore, read and write requests to the memory 12 generally include an address to select the memory locations within each memory device that are read or written, control lines to control the access to the memory, etc., which have not been illustrated in FIG. 2. Thus, the memory controller 10 may include other circuitry (not shown) controlling the read and write of the memory 12. Additionally, the memory controller 10 may include circuitry (not shown) for interfacing to the source(s) of memory requests.

The memory 12 may have any desired arrangement. For example, the memory 12 may be arranged into a plurality of banks. The memory devices MD_0 to MD_N−1 may be part of one bank, and other memory devices (not shown) may be part of other banks. As mentioned above, the memory devices may be configured onto memory modules, which may be part of one or more memory banks, as desired.

Figure 3:
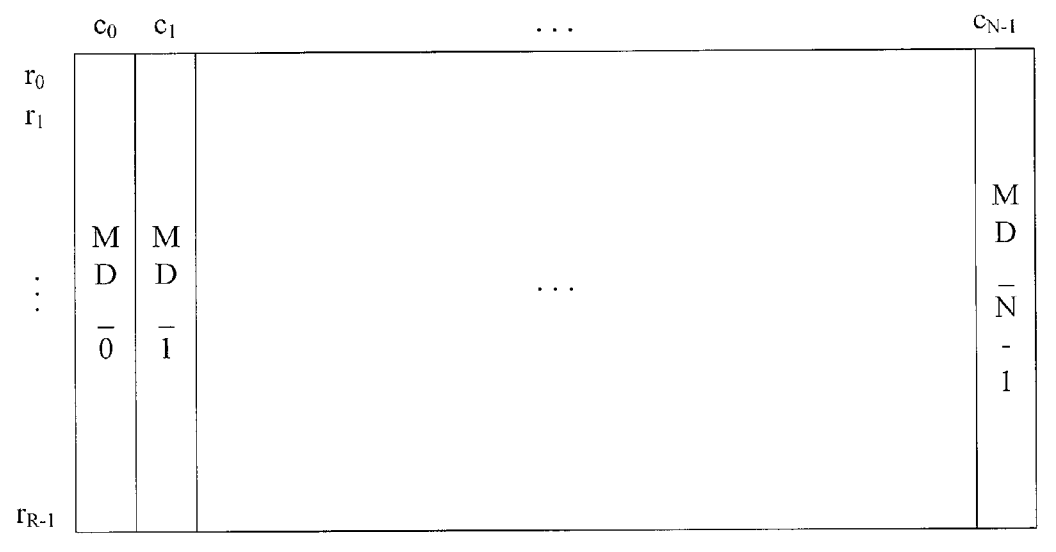

FIG. 3 is a block diagram of one embodiment of a code word. Other embodiments are possible and contemplated. FIG. 3 illustrates the code word logically arranged as an array of rows and columns. Each column comprises the bits stored in one of the memory devices. Thus, the number of rows is equal to the number of bits of the code word supplied by each memory device (R bits, where R is a positive integer). Thus, the rows are numbered $r_0$ to $r_{R-1}$. For example, column 0 ($c_0$) are the bits of the code word stored in memory device 0 (MD_0), column 1 ($c_1$) are the bits of the code word stored in memory device 1 (MD_1), etc. up to column N−1 ($c_{N-1}$) having the bits of the code word stored in memory device N−1 (MD_N−1).

Error Code Definition

One embodiment of a definition of the check bit encodings to provide various error detection/correction properties based on the code word shown in FIG. 3 will next be described with reference to FIG. 4. For this embodiment, the check bits include a set of row check bits and a set of inner check bits. The row check bits are stored in a selected column of the code word (e.g., column zero in FIG. 4, although any column may be selected). The inner check bits are stored in a different column than the row check bits (e.g. column one in FIG. 4, although any column may be selected). The remaining columns store the data for which error detection/correction is being provided (which may include metadata, in some embodiments). In various embodiments, there may be fewer inner check bits than there are rows in the array. Thus, the inner check bit column is illustrated as optionally stopping above the last row in FIG. 4 (dotted horizontal line). The remaining bits in the column with the inner check bits may store data bits or metadata bits.

Each row check bit covers the bits that are in each other column of the code word and in the same row as that row check bit. For example, the row check bit in row $r_0$ covers the bits that are in each other column and in row $r_0$.

Decoding the code word to detect an error may include XORing the bits in each row (including the row check bit) to generate a corresponding bit of a row syndrome. If the row syndrome is not zero, then an error has occurred. The decoding may further include other manipulations of the data and the row syndrome (and an inner syndrome over the inner check bits) to determine what the failure is and, in some cases, the correction to be performed. The assignment of inner check bits to cover various data bits causes an error in a given position in the logical array to generate the inner syndrome, and by appropriate assignment of check bits to data bits, various error detection and correction properties may be realized.

Generally, the row check bits may be used to identify the failure of a memory device, and to reconstruct the data bits which were stored in the failed memory device. For example, row check bits may be the XOR of each other bit in the same row, and thus may detect that a given bit in the row has changed (e.g. due to the failure of the memory device which stores that bit). By XORing the other bits in the row and the row check bit, the changed bit may be reconstructed. Alternatively, once the failed column is identified, the bits in the row syndrome that are non-zero identify bits in the failed column that are to be inverted to reconstruct the data from the failed column.

The failure of a memory device causes at least one row to indicate a failure. That is, the row check bits identify which rows of the logical array contain an error, but not which column the errors are in. The inner check bits may be assigned to cover various data bits to identify which particular memory device (which column of the code word array) has failed (thus permitting the reconstruction of the data from the failed memory device and the remapping of the code word to exclude the failed memory device, if desired). For the remainder of this discussion, "failed memory device" or "failed DRAM" and "failed column" may be used. The failed column may be the column of the array which corresponds to the failed memory device or failed DRAM.

Figure 5:
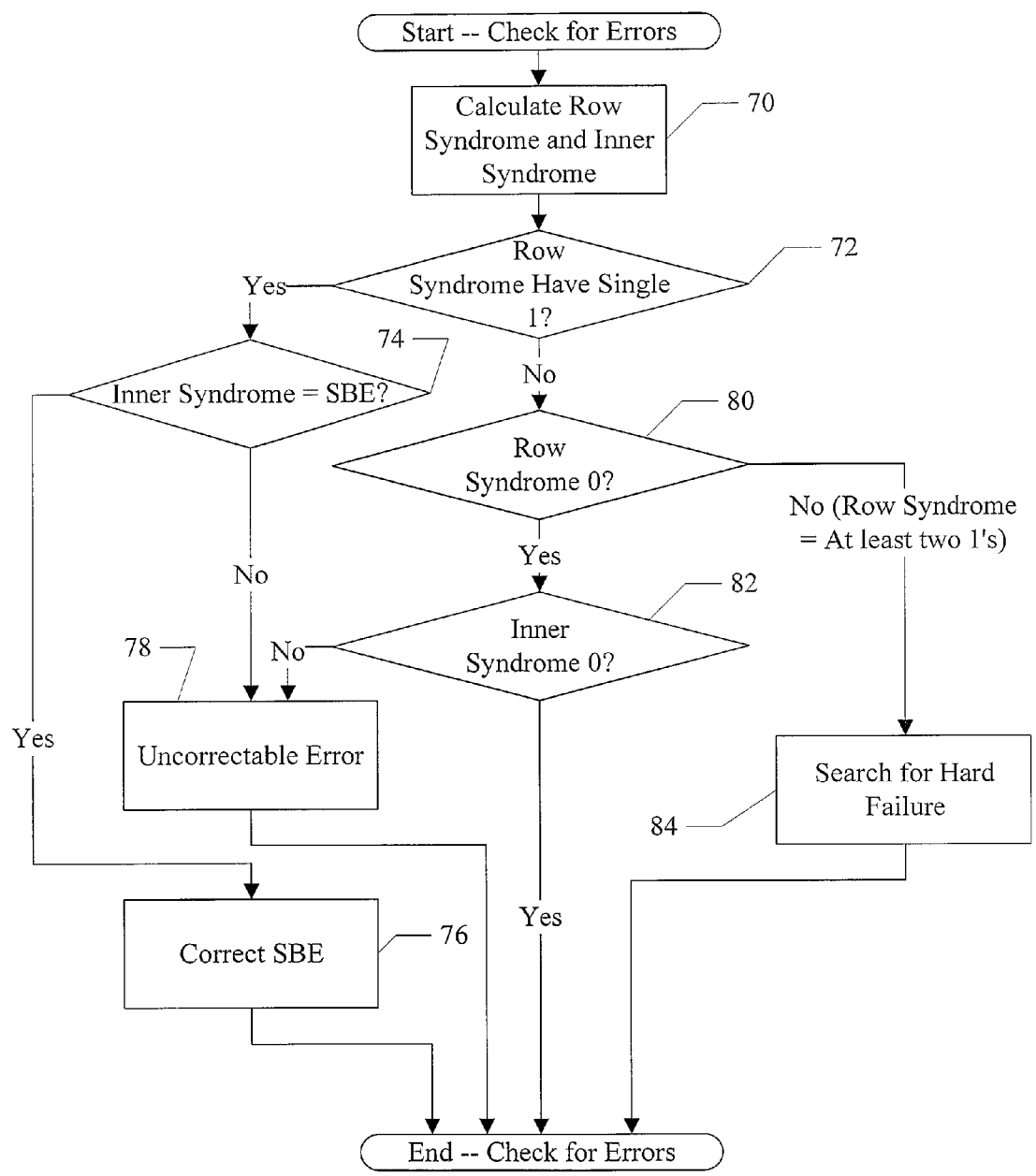
FIG. 5 is a flowchart illustrating operation of one embodiment of a memory controller to check for errors in data.

In one embodiment, the memory controller 10 (and more particularly the error check/correct circuit 18 and/or the hard failure detection circuit 22, in one embodiment) may implement a mechanism to identify hard failures when multi-bit errors are detected. Specifically, the flowchart illustrated in FIG. 5 may illustrate operation of the memory controller 10 to check for errors in data read from the memory 12. While the blocks are shown in FIG. 5 in a particular order to ease understanding, other orders may be used. Blocks may be performed in parallel by combinatorial logic in the memory controller 10. Blocks, combinations of blocks, and/or the flowchart as a whole may be pipelined over multiple clock cycles.

The error check/correct circuit 18 may calculate the row syndrome and the inner syndrome for the encoded data block (block 70). If the row syndrome includes a single binary one (decision block 72, "yes" leg), it is possible that a single bit error has been detected. If the inner syndrome identifies a single bit error in one of the columns (decision block 74, "yes" leg), the error check/correct circuit 18 may correct the single bit error (block 76). If the inner syndrome does not indicate a single bit error (decision block 74, "no" leg), then the error is uncorrectable (block 78). The determination of whether or not the inner syndrome indicates a single bit error depends on the particular definition of the inner check bits. As previously noted, considerable flexibility may be permitted in the definition of the inner check bits. For example, in one embodiment described below, a check vector is assigned to each bit in the array that indicates which check bits cover the bit. If the inner syndrome matches a check vector in the row identified by the row syndrome, then a single bit error may be detected.

If the row syndrome is zero (decision block 80, "yes" leg) and the inner syndrome is zero (decision block 82, "yes" leg), there is no error. On the other hand, if the row syndrome is zero (decision block 80, "yes" leg) and the inner syndrome is non-zero (decision block 82, "no" leg), an uncorrectable error is detected (block 78).

If the row syndrome includes at least two binary ones (decision blocks 72 and 80, "no" legs), the error check/correct circuit 18 may provide the row syndrome to the hard failure detection circuit 22. The hard failure detection circuit 22 may perform a plurality of memory operations to search for a hard failure in the memory locations storing the data block for which the error is detected (block 84).

Figure 6:
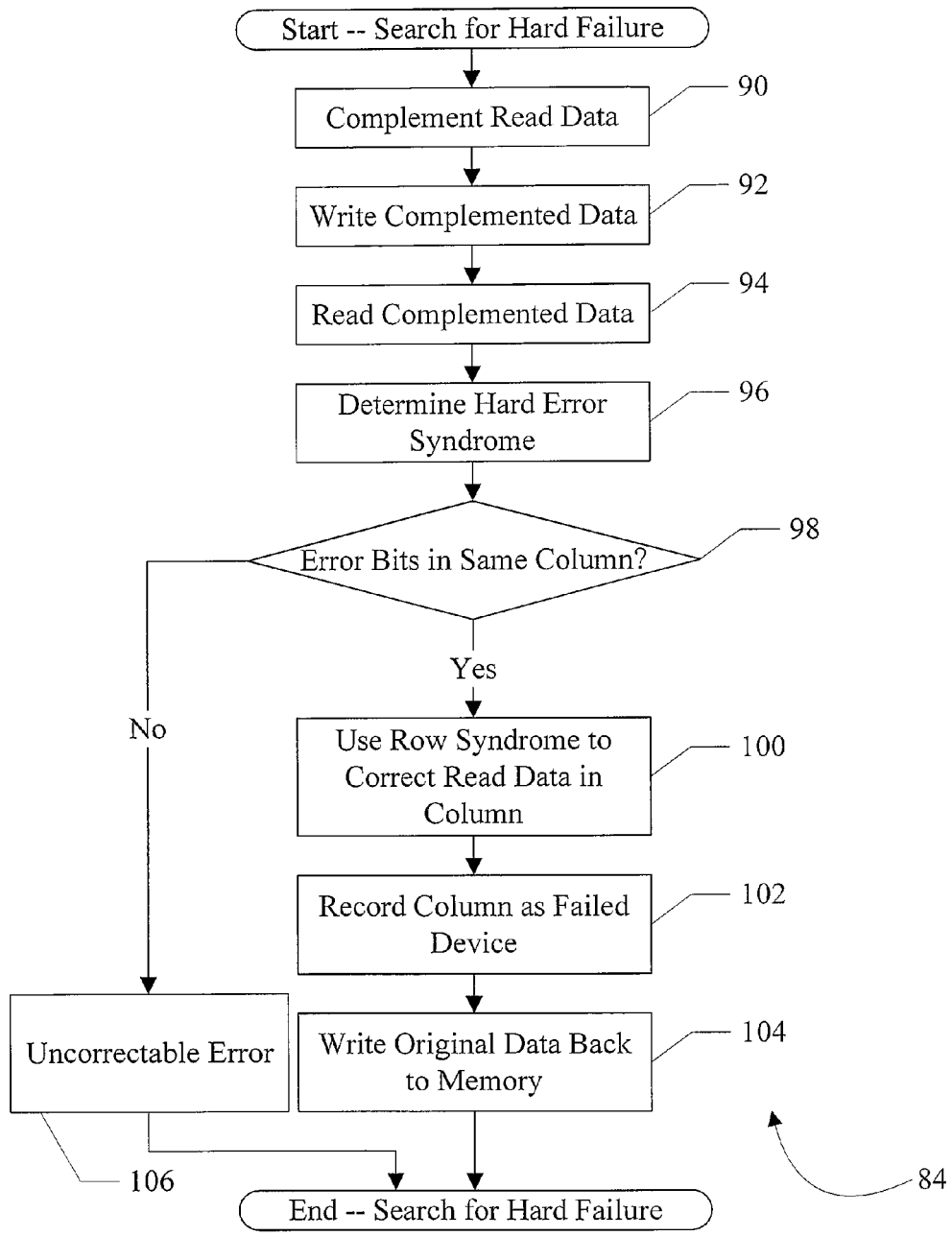
FIG. 6 is a flowchart illustrating operation of one embodiment of the memory controller to search for hard failures (e.g.

One embodiment of the hard failure detection circuit 22 implementing the search for a hard error is illustrated in the flowchart of FIG. 6. While the blocks are shown in FIG. 6 in a particular order to ease understanding, other orders may be used. Blocks may be performed in parallel by combinatorial logic in the memory controller 10. Blocks, combinations of blocks, and/or the flowchart as a whole may be pipelined over multiple clock cycles.

In the illustrated embodiment, the hard failure detection circuit 22 may capture the encoded data read from the memory. In response to the multiple-one-bit row syndrome, the hard failure detection circuit 22 may complement the encoded data that was read (block 90) and write the complemented data back to the memory 12 (block 92). The memory controller 10 may use the same address provided when the erroneous data was read from the memory 12, so the complemented data is written to the same memory locations from which the erroneous read data was read. Since each bit in the data has been inverted by the complement operation, each bit should have been changed to the opposite state. If a bit storage location in memory has experienced a hard error (or "stuck at" error, since the bit is stuck at a zero or a one), the bit will be the same as the previous read. Accordingly, the hard failure detection circuit 22 may read the complemented data from memory (block 94) and may determine the hard error syndrome (block 96). For example, the hard error syndrome may comprise the bitwise exclusive NOR (XNOR) of the originally read data and the complemented data. Any bits that did not change state will have an XNOR result of one, and bits that did (correctly) change state will have an XNOR result of zero. Accordingly, the hard error syndrome may comprise set bits in the hard error locations. Alternatively, a bitwise exclusive OR (XOR) may be performed and the bits that are clear may indicate the hard error locations.

Generally, if any hard error is detected, the hard failure detection circuit 22 may attempt to identify the failing component and correct the data based on the failing component. For example, in one embodiment, the hard failure detection circuit 22 may determine if the bits detected as hard failures are in the same column of the logical array shown in FIG. 3 (and thus the bits are stored in the same memory component). If the bits are not in the same column, then at least two devices may have hard failures, which is uncorrectable in this embodiment (decision block 98, "no" leg and block 106). If the bits are in the same column (decision block 98, "yes" leg), the hard failure detection circuit may use the row syndrome to correct the originally-read data in the column (block 100). The hard failure detection circuit 22 may also record the column as the failed device in the persistent storage 20, permitting the error check/correct circuit 18 to correct future reads for the failed device (block 102). In some embodiments, the memory controller 10 may "map out" the failed device, using unused bits or check bit locations to store the bits that would have been stored in the failed device. The hard failure detection circuit 22 may also write the original data back to memory (corrected), since the hard failure detection circuit 22 overwrote the data with the complemented data (block 104).

It is noted that any set of memory operations may be used to detect the hard failures. For example, the hard failure detection circuit 22 may write all zeros to the memory locations, read the data back, write all ones, and read the data back. The two data reads may then be used to compute the hard error syndrome as discussed above. Any data and its complement may be read and written, in various embodiments.

The above description has referred to the hard failure detection circuit 22 performing read and write operations to the memory 10. The operations may be performed by the hard failure detection circuit 22 directly, or they may be transmitted through the paths in the check bit encoder circuit 16 and error check/correct circuit 18 (without performing the encode/decode). Thus, the hard failure detection circuit 22 performing the memory operations may include both directly and indirectly causing the memory operations.

The above embodiments have permitted significant variation in the definition of the inner check bits. Choosing the inner check bits in specific fashions may provide additional error detection and/or correction properties.

For example, in one embodiment, a check vector is assigned to each bit in the array. The check vector corresponding to a given bit defines which of the inner check bits cover the given bit. Given a set of check vectors assigned to the array, a given inner check bit may be generated (e.g. by the check bit encoder circuit 16) by combining each of the bits in the array covered by the given inner check bit (as indicated by the corresponding check vectors). For example, the check vector may be a vector of X bits, each location of which corresponds to a row in the inner check bit column. If the bit in the check vector is set, the corresponding inner check bit covers the bit to which the check vector is assigned.

Figures 7, 8:
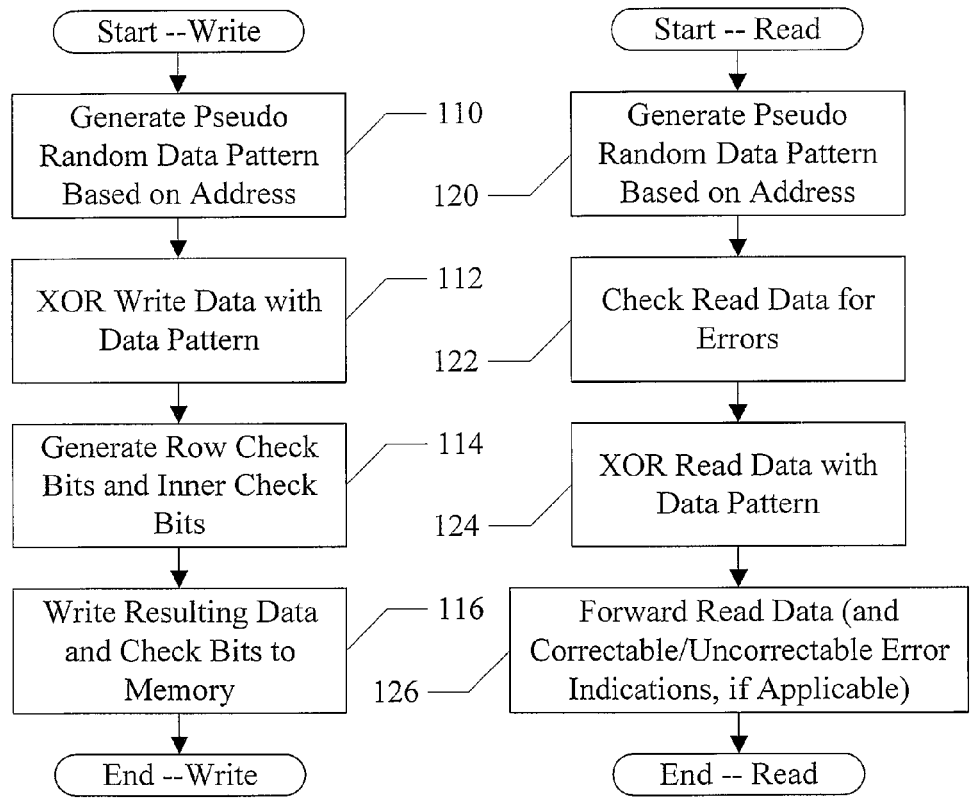
FIG. 7 illustrates certain equations applicable to one embodiment of the code word.
FIG. 8 is a set of flowcharts illustrating a read and a write implementing one embodiment of data whitening.

The check vectors may be defined as follows, in one embodiment. For each column, a "key" is selected from the elements of $GF(2^X)$. The key for each column is unique. That is, the keys are different elements of $GF(2^X)$. The check vectors for the rows in a given column may be generated by multiplying, in $GF(2^X)$, the key by $alpha^Y$, where Y is the row number and alpha is a primitive element of $GF(2^X)$. The check vector for row $0$ ($r_0$) of a given column may be equal to the key assigned to the given column (since multiplying an element by $alpha^0$ results in that element). This equation is shown in FIG. 7 (reference numeral 30), where $Check\_Vector(r_z, c_y)$ is the check vector for row Z and column y and key_y is the key for column y.

Additionally, in one embodiment, the keys may be strictly non-zero. See FIG. 7, equation 34. That is, each key includes at least one binary one. Since the row check bits are covered by the inner check bits, and are used to generate the inner check bits, circular definitions are possible if the keys for the row check bit column and inner check bit column are chosen such that the inner check bit used to generate a given row check bit is covered by that row check bit. Accordingly, the keys are selected such that a non-circular definition of the check bits is created. In one embodiment, as mentioned above, if the row check bits key is selected as all binary zeros except the least significant two bits (which are binary ones), a non-circular definition results. However, other keys may be selected that result in a non-circular definition.

Given the above definition of the check vectors, the equation at reference numeral 32 may be used to detect a failure of one column (where the arithmetic is performed in $GF(2^X)$). In the equation 32, row_syn is the row syndrome (viewed as an element of $GF(2^X)$), key_i is the key for column i, and inner_syn is the inner syndrome. Assuming X is less than R, the row syndrome can be viewed as an element of $GF(2^X)$ by viewing the R bits of the row syndrome as the coefficients of a degree-$(R-1)$ polynomial and converting this polynomial to a degree-$(X-1)$ polynomial by performing a modulus operation relative to the primitive polynomial used in defining the $GF(2^X)$. In this way, any polynomial (with Boolean coefficients) can be viewed as an element of $GF(2^X)$.

The inner syndrome is a bit vector, viewed as an element of $GF(2^X)$, where each bit is calculated by XORing the bits covered by the corresponding inner check bit with the inner check bit. Thus, if the row syndrome is non-zero, the inner syndrome divided by the row syndrome (in $GF(2^X)$) is equal to key_i. By comparing result of the division to each of the keys, the failed column may be identified (and the row syndrome may be used to reconstruct the data from the failed column) with a probability of approximately $1-2^{-X}$. It is noted that, in some embodiments, rather than performing division as mentioned above, the error check/correct circuit 18 may guess that the error occurs in each column (in parallel) and may calculate the inner syndrome that would occur if the bits indicated by the row syndrome were in error in that column, and compare the calculated inner syndrome to the actual inner syndrome. Additionally, in one embodiment, if the row syndrome viewed as an element of $GF(2^X)$ is non-zero, the check for hard failures (block 84 in FIGS. 5 and 6) may be avoided.

As described above, Galois field arithmetic is used in the error code. Generally, a Galois Field is a finite field of numbers having the property that arithmetic operations on field elements (numbers in the field) have a result in the field (i.e. another element of the field). Addition may be defined in a Galois Field of size $2^X$ to be bitwise exclusive OR (XOR) of the elements. A primitive element (alpha) of a Galois Field is an element used to generate the other elements of the Galois Field. Each of the elements of the Galois Field may be written as the sum of powers of alpha. There is at least one primitive element for a Galois field, but there may be more than one in some instances. In one embodiment, alpha is defined to satisfy the equation:

$$alpha^{16} = 1 + alpha^2 + alpha^3 + alpha^5$$

although alpha may be defined differently in other embodiments. In another view, any element of the Galois Field may be the linear combination of powers of alpha up to $X-1$, where the powers used in the linear combination correspond to bit positions in the element that have set (binary one) bits.

In one embodiment, the key for the column storing the inner check bits (e.g. column $c_1$ in FIG. 4) may be selected as the element having all binary zeros except for a binary one in the least significant position. Multiplying such an element by $alpha^X$ has the effect of shifting the binary one to position X. Thus, the inner check bit X may be stored in row X of the column storing the inner check bits.

Other definitions of the inner check bits are possible for other embodiments. For example, Hamming-like codes may be used. In one embodiment, the inner check bits may be defined as a Hamming code per row of the array shown in FIG. 4. In one specific example, a bit in column L, where $0<=L<=N-1$, is covered by inner check bit "i" if and only if bit I of the binary representation of L is a one. Such a code has the property that any double bit errors in which the bits in error are located in different devices are detected.

Some of the above embodiments provide probabilistic detection of errors. Assuming that the data is randomly distributed, the probability of the undetectable cases occurring may be low. However, data is not always randomly distributed. To improve the randomness of the data, the data may be "whitened" by logically combining the data with a predictable pseudo-random pattern. For example, the pattern may be based on the address of the memory operations.

Turning now to FIG. 8, a pair of flowcharts are shown illustrating operation of one embodiment of the memory controller 10 (and more particularly the check bit encoder 16 and the error check/correct circuit 18, in one embodiment) to perform the data whitening. While the blocks are shown in FIG. 8 in a particular order to ease understanding, other orders may be used. Blocks may be performed in parallel by combinatorial logic in the memory controller 10. Blocks, combinations of blocks, and/or the flowchart as a whole may be pipelined over multiple clock cycles.

The check bit encoder circuit 16 may implement the operation of the write flowchart on the left side of FIG. 8 for each data write. The check bit encoder circuit 16 may generate a pseudo-random data pattern based on the address (block 110). For example, bits of the address may be logically combined (e.g. XORed) to create the pattern. The check bit encoder circuit 16 may XOR the write data with the data pattern (block 112). In one embodiment, the circuitry implementing blocks 110 and 112 may be combined. That is, there may the circuitry that generates the pseudo-random data pattern and the circuitry that XORs the data pattern with the write data may be merged. The check bit encoder circuit 16 may generate the row check bits and inner check bits over the modified data (block 114). Again, the circuitry may be merged with the generation of the pseudo-random data pattern and the XORing of the pattern with the write data. The check bit encoder circuit may write the encoded data (comprising the row check bits, the inner check bits, and the modified data) to memory (block 116).

The error check/correct circuit 18 may implement the operation of the read flowchart on the right side of FIG. 8 for each data read. The error check/correct circuit 18 may generate the same pseudo-random data pattern based on the address that the check bit encoder circuit 16 generates (block 120). The error check/correct circuit 18 may use the row check bits and inner check bits to check the data for errors (block 122). For example, the checking may be similar to that shown in FIGS. 5 and 6. The error check/correct circuit 18 may XOR the read data with the data pattern (block 124). In one embodiment, the circuitry implementing blocks 120 and 124 may be combined. The error check/correct circuit 18 may forward the read data (possibly corrected or with an uncorrectable error indication) to the source of the read memory operation (block 126).

Figure 9:
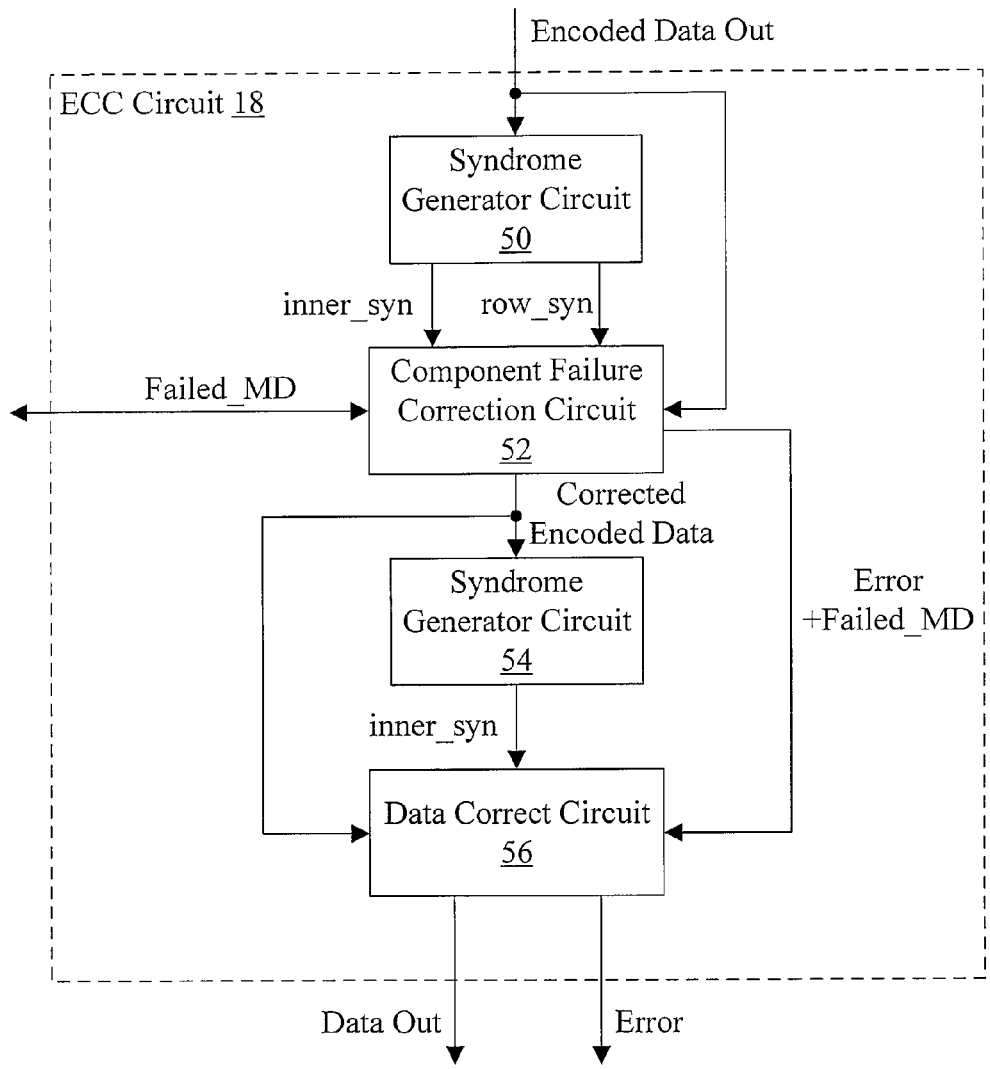
FIG. 9 is a block diagram illustrating one embodiment of an ECC circuit shown in FIG. 2 in more detail.

Turning now to FIG. 9, a block diagram illustrating one embodiment of the error check/correct circuit 18 is shown. In the illustrated embodiment, the error check/correct circuit 18 includes a syndrome generator circuit 50, a component failure correction circuit 52, a syndrome generator circuit 54, and a data correct circuit 56. The syndrome generator circuit 50 is coupled to receive the code word (Encoded Data Out), and is configured to generate the inner syndrome (inner_syn) and the row syndrome (row_syn). The component failure correction circuit 52 is coupled to receive the code word and the inner syndrome and row syndrome from the syndrome generator circuit 50. Additionally, the component failure correction circuit 52 is coupled to receive the failed_MD indication from the persistent state storage 20. The component failure correction circuit 52 is coupled to provide corrected encoded data to the syndrome generator circuit 54 and to the data correct circuit 56. Additionally, the component failure circuit 52 may be coupled to provide an error indication and the failed_MD indication to the data correct circuit 56. The syndrome generator circuit 54 is coupled to provide an inner syndrome generated from the corrected encoded data to the data correct circuit 56, which is coupled to provide the output data and an error signal.

The syndrome generator circuit 50 may generate the row syndrome and inner syndrome for the received code word, as described above. The component failure correction circuit 52 is configured to reconstruct the data from the failed component (e.g. memory device, in this embodiment) given the row syndrome, the inner syndrome, and the code word.

In one embodiment, the component failure correction circuit 52 may comprise circuitry to use the failed_MD to locate the failed column and correct the failure.

The syndrome generator circuit 54 receives the corrected encoded data from the component failure correction circuit 54, and generates a new inner syndrome over the corrected encoded data. If the inner syndrome generated by the syndrome generator circuit 54 is non-zero, additional data correction may be possible. The data correct circuit 56 performs these error detections/corrections, and signals uncorrectable error where appropriate.

Communication System

Figure 10:
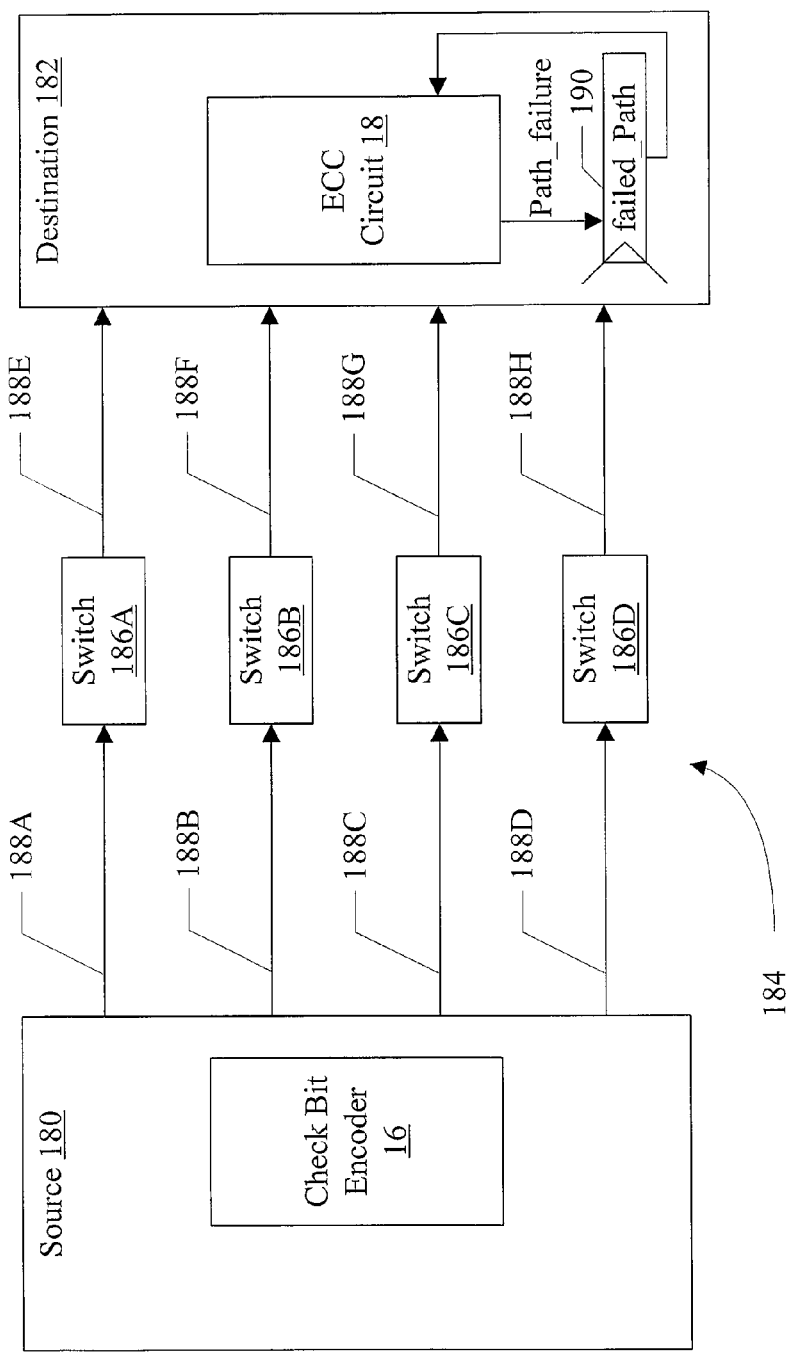
FIG. 10 is a block diagram of one embodiment of a communication system.

Turning now to FIG. 10, a block diagram of one embodiment of a communication system is shown. In the embodiment of FIG. 10, the communication system includes a source device 180 and a destination device 182. The source device 180 includes the check bit encoder circuit 16 (which is similar to the above description with regard to FIGS. 1-9). The destination device 182 includes the error check/correct circuit 18 (which is similar to the above description with regard to FIGS. 1-9) and may include a persistent state storage 190 which may store an indication of a failed path. The error check/correct circuit 18 is coupled to the persistent state storage 190 and may provide an indication of a path failure from the destination 182 (particularly, from the error check/correct circuit 18). The path failure may be similar to a failed memory device in the embodiment of FIG. 2, and may be handled by the error check/correct circuit 18 in a similar fashion. The check bit encoder circuit 16 is coupled to receive unencoded data from within the source device 180 and is configured to encode a packet comprising one or more code words (including the data and check bits) for transmission over the transmission media 184 to the destination device 182. The error check/correct circuit 18 decodes the code words (detecting any errors according to the check bit definitions and optionally correcting detected errors), and may pass the corresponding received data internally to the destination device 182. The data from a code word that is transmitted through one of the switches 186A-186D may be referred to as a "slice".

In the illustrated embodiment, the transmission media 184 includes conductors coupled between the source device 180 and a set of switches 186 and conductors coupled between the switches 186 and the destination device 182. For example, FIG. 10 illustrates the conductors 188A between the source device 180 and the switch 186A; the conductors 188B between the source device 180 and the switch 186B; the conductors 188C between the source device 180 and the switch 186C; and the conductors 188D between the source device 180 and the switch 186D. Additionally, FIG. 10 illustrates the conductors 188E between the switch 186A and the destination device 182; the conductors 188F between the switch 186B and the destination device 182; the conductors 188G between the switch 186C and the destination device 182; and the conductors 188H between the switch 186D and the destination device 182. Each of conductors 188A-188H may comprise two or more conductors (that is, each switch 186A-186D may be coupled to at least two conductors from the source device 180 and at least two conductors to the destination device 182).

Figure 11:
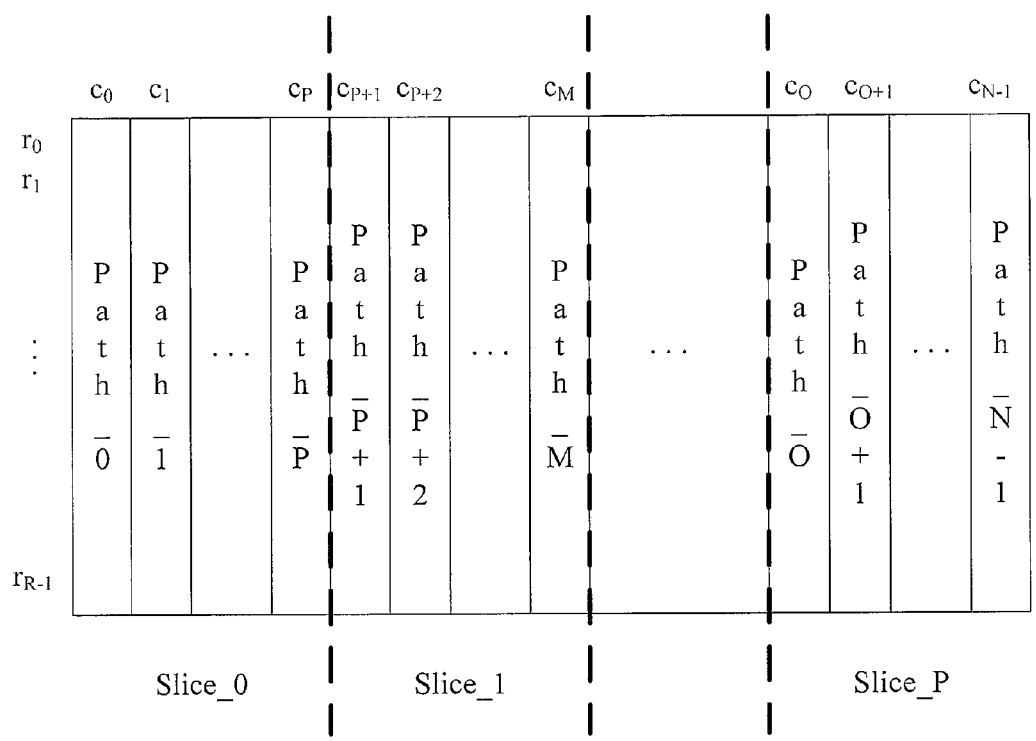
FIG. 11 is a block diagram illustrating a logical array of data bits forming one embodiment of a code word, indicating the transmission of the bits on conductors within slices.

FIG. 11 illustrates one embodiment of a code word which may be used for transmitting data on the transmission medium 184. In the embodiment of FIG. 11, the code word is arranged as a logical array of rows and columns. Each column may correspond to one conductive path (or more briefly, "path") between the source device 180 and the destination device 182. For example, in the embodiment illustrated in FIG. 19, a conductive path may comprise a conductor within conductors 188A and a corresponding conductor within conductors 188E. Thus, in FIG. 11, column zero corresponds to path_0, column 1 corresponds to path_1, etc. Each transmission on a given path which forms part of the code word is a row of the code word. Thus, row 0 may be the first transmission on the paths, row 1 may be the second transmission on the paths, etc.

In the embodiment of FIG. 11, the columns of the array are further delimited by heavy dashed lines to illustrate slices (e.g. slice_0, slice_1, etc., through slice_p). Slice_0 may be the data transmitted through switch 186A, for example, while other slices may be the data transmitted through other switches.

Generally, the various embodiments of check bits in accordance with the above described memory controller may be used in the communication system of FIG. 10. The paths may be handled in a manner similar to memory devices. That is, each path may be treated, for check bit definition, similar to a memory device. Check bits may be carried in any columns of the code word (e.g. column 0 may be used for row check bits, column 1 may be used for inner check bits). Thus, for example, in various embodiments, a failure of a given path may be detected and corrected (and optionally mapped out, if the failed path indication is transmitted to the check bit encoder 16).

If the error check/correct circuit 18 transmits a path_failure indication to the source device 180 in response to detecting a path failure, the failing path may be "mapped out" by ceasing use of the failing path for subsequent packets, and by using one of the other paths to transmit the bits previously transmitted on the failing path (e.g. unused paths, similar to the above described memory device embodiments). In other embodiments, instead of transmitting the path_failure indication to the source device 180, the destination device 182 may inform a service processor of the failure. The service processor may inform the source device 180 (and any other source devices which may use the failing path) to cease using the failing path. Alternatively, the failing path may continue to be used, and the error check/correct circuit 18 may correct for the failing path.

It is noted that, while a single switch is shown for each set of conductors in FIG. 10, each switch may actually be implemented as multiple switches in a hierarchical or peer-to-peer connection between the source device 180 and the destination device 182. Additionally, while a given switch is shown coupled between the source device 180 and the destination device 182, the switch may have additional connections to other destination devices (not shown in FIG. 10) and may route a packet from the source device 180 to one of the destination devices. Furthermore, in other embodiments, the switches 186A-186D may be replaced by any other transmission circuits (e.g. repeaters). Generally, a transmission circuit may include any circuitry coupled to two or more conductors and configured to transmit data on the conductors. In other embodiments, no switches may be employed (e.g. there may be a point-to-point connection between the source device 180 and the destination device 182). In such embodiments, path failures may be detected in a manner similar to memory device failures. In another embodiment, the code word may be defined such that each slice may comprise a column, and data concurrently transmitted on the slice may comprise the rows of the column corresponding to the slice.

Computer System

Turning next to FIG. 12, a block diagram illustrating one embodiment of a computer system including the memory controller 10 and the memory 12 is shown. Additionally, the computer system includes one or more processors (e.g. the processors 60A-60M shown in FIG. 12). The processors 60A-60M are coupled to the memory controller 10 via an interconnect 62. The processors 60A-60M may be sources of read/write requests to the memory controller 10. Additionally, the computer system may include one or more peripheral devices coupled to the interconnect 62 or indirectly coupled through an input/output (I/O) bridge circuit. Furthermore, the computer system may include multiple memories and/or memory controllers. The peripheral devices may also be sources of read/write requests to the memory controller 10.

Numerous variations and modifications will become apparent to those skilled in the art once the above disclosure is fully appreciated. It is intended that the following claims be interpreted to embrace all such variations and modifications.

What is claimed is:

1. A memory controller comprising:
    a check bit encoder circuit coupled to receive a data block to be written to memory, wherein the check bit encoder circuit is configured to generate a corresponding encoded data block comprising the data block, a first plurality of check bits, and a second plurality of check bits; and
    a check/correct circuit coupled to receive an encoded data block read from the memory, the check/correct circuit configured to detect an error in the encoded data block responsive to the first plurality of check bits, the second plurality of check bits, and the data block within the encoded data block, and wherein the encoded data block is logically arranged as an array of R rows and N columns, wherein R and N are positive integers, and wherein each of the first plurality of check bits covers a respective row of the array, and wherein the check/correct circuit is configured to generate a first syndrome corresponding to the first plurality of check bits, and wherein a presence of more than one binary one in the first syndrome indicates a multi-bit error; and
    a hard failure detection circuit coupled to the check/correct circuit wherein, responsive to detecting the multi-bit error, the hard failure detection circuit is configured to perform a plurality of memory read/write operations to the memory locations in which the encoded data block is stored to identify a hard error failure in the memory.

2. The memory controller as recited in claim 1 wherein the plurality of memory read/write operations includes at least one write that updates the memory locations with different data than the encoded data block.

3. The memory controller as recited in claim 2 wherein the at least one write updates the memory locations with the complement of the encoded data block.

4. The memory controller as recited in claim 3 wherein the plurality of memory operations includes at least one read operation to read the complement of the encoded data block.

5. The memory controller as recited in claim 4 wherein the hard failure detection circuit is configured to logically combine the encoded data block and the complement of the encoded data block to identify the hard error failure.

6. The memory controller as recited in claim 5 wherein the logical combination comprises exclusive NOR (XNOR), and wherein each binary one bit in a result of the XNOR indicates a hard failure bit.

7. The memory controller as recited in claim 6 wherein the memory comprises a plurality of memory devices, and wherein, responsive to all the hard failure bits being located in the same memory device of the plurality of memory devices, the error check/correct circuit is configured to correct the hard error in the data block and provide the corrected data block.

8. The memory controller as recited in claim 1 wherein the first plurality of check bits form a first column of the array, and wherein the second plurality of check bits are stored in a second column of the array and are defined to cover bits in the array according to a plurality of check vectors, each of the plurality of check vectors corresponding to a different bit in the array, and each of the plurality of check vectors is an element of a Galois Field ($GF(2^X)$), and wherein X is a positive integer equal to a number of the second plurality of bits, and wherein the plurality of check vectors are derived from a plurality of unique elements of $GF(2^X)$, each of the plurality of unique elements corresponding to a different column of the array, and wherein each of the plurality of unique elements includes at least one non-zero bit, including the element corresponding to the first column of the array, and wherein the check vector in row Z of the column is the product, in $GF(2^X)$ of the unique element for that column and alpha$^Z$, wherein alpha is a primitive element of $GF(2^X)$.

9. The memory controller as recited in claim 8 wherein if the first syndrome, when viewed as an element of $GF(2^X)$, is non-zero, the hard failure detection circuit is configured to inhibit performing the hard error failure detection.

10. A method comprising:
    reading an encoded data block from memory, wherein the encoded data block comprises a data block, a first plurality of check bits, and a second plurality of check bits;

detecting an error in the encoded data block responsive to the first plurality of check bits, the second plurality of check bits, and the data block within the encoded data block, wherein the encoded data block is logically arranged as an array of R rows and N columns, wherein R and N are positive integers, and wherein each of the first plurality of check bits covers a respective row of the array, and wherein detecting the error comprises generating a first syndrome corresponding to the first plurality of check bits, and wherein a presence of more than one binary one in the first syndrome indicates a multi-bit error; and responsive to detecting the multi-bit error, identifying a hard failure in the memory by performing a plurality of memory read/write operations to the memory locations in which the encoded data block is stored.

11. The method as recited in claim 10 wherein the plurality of memory read/write operations includes at least one write that updates the memory locations with different data than the encoded data block.

12. The method as recited in claim 11 wherein the at least one write updates the memory locations with the complement of the encoded data block.

13. The method as recited in claim 12 wherein the plurality of memory operations includes at least one read operation to read the complement of the encoded data block.

14. The method as recited in claim 13 wherein identifying the hard failure comprises logically combining the encoded data block and the complement of the encoded data block.

15. The method as recited in claim 14 wherein the logically combining comprises exclusive NORing (XNORing), and wherein each binary one bit in a result of the XNOR indicates a hard failure bit.

16. The method as recited in claim 15 wherein the memory comprises a plurality of memory devices, and method comprises:

determining that all the hard failure bits are located in the same memory device of the plurality of memory devices; and correcting the hard error in the data block and provide the corrected data block.

17. The method as recited in claim 10 wherein the first plurality of check bits form a first column of the array, and wherein the second plurality of check bits are stored in a second column of the array and are defined to cover bits in the array according to a plurality of check vectors, each of the plurality of check vectors corresponding to a different bit in the array, and each of the plurality of check vectors is an element of a Galois Field ($GF(2^X)$), and wherein X is a positive integer equal to a number of the second plurality of bits, and wherein the plurality of check vectors are derived from a plurality of unique elements of $GF(2^X)$, each of the plurality of unique elements corresponding to a different column of the array, and wherein each of the plurality of unique elements includes at least one non-zero bit, including the element corresponding to the first column of the array, and wherein the check vector in row Z of the column is the product, in $GF(2^X)$ of the unique element for that column and $alpha^Z$, wherein alpha is a primitive element of $GF(2^X)$.

18. The method as recited in claim 17 further comprising:
reading a second encoded data block from memory;
generating a second syndrome corresponding to the first plurality of check bits and the second encoded data block; and
viewing the second syndrome as an element of $GF(2^X)$, and wherein, responsive to detecting that the second syndrome is non-zero in $GF(2^X)$, not attempting to identify a hard error failure for the second encoded data block.

* * * * *